United States Patent [19]

Timby et al.

[11] Patent Number: 4,564,333

[45] Date of Patent: Jan. 14, 1986

[54] FUEL SUPPLY APPARATUS

[75] Inventors: Ernest A. Timby, Camberley; Rodney H. Walsh, Hindhead; Robert S. Wood, Gosport, all of England

[73] Assignee: The Secretary of State for Defence in Her Britannic Majesty's Government of the United Kingdom of Great Britain and Northern Ireland, Great Britain

[21] Appl. No.: 550,208

[22] Filed: Nov. 9, 1983

Related U.S. Application Data

[63] Continuation-in-part of Ser. No. 379,950, May 19, 1982, abandoned.

[30] Foreign Application Priority Data

May 22, 1981 [GB] United Kingdom ................ 8115843

[51] Int. Cl.[4] .......................... F02C 9/04; B64D 37/32
[52] U.S. Cl. ................................. 415/86; 415/121 R
[58] Field of Search ............... 415/121 B, 121 R, 143, 415/87, 86, 65, 68, 69

[56] References Cited

U.S. PATENT DOCUMENTS

| 875,131 | 12/1907 | Stevens | 415/87 |
| 1,158,978 | 11/1915 | Büchi | 415/87 |
| 2,606,502 | 8/1952 | Carlson | 415/121 B X |
| 3,626,694 | 12/1971 | Holste | 415/143 X |
| 4,238,926 | 12/1980 | Timby et al. | 60/39.46 R |
| 4,261,175 | 4/1981 | Timby et al. | 60/721 |

FOREIGN PATENT DOCUMENTS

| 858879 | 3/1953 | Fed. Rep. of Germany | 415/86 |
| 410376 | 12/1909 | France | 415/87 |
| 108904 | 8/1979 | Japan | 415/121 B |
| 141403 | 11/1979 | Japan | 415/121 B |

Primary Examiner—Abraham Hershkovitz
Assistant Examiner—Joseph M. Pitko
Attorney, Agent, or Firm—Cushman, Darby & Cushman

[57] ABSTRACT

A pump for supplying liquid fuel to an engine and which incorporates means, in the form of shear members, for degrading an anti-misting additive in the fuel.

8 Claims, 3 Drawing Figures

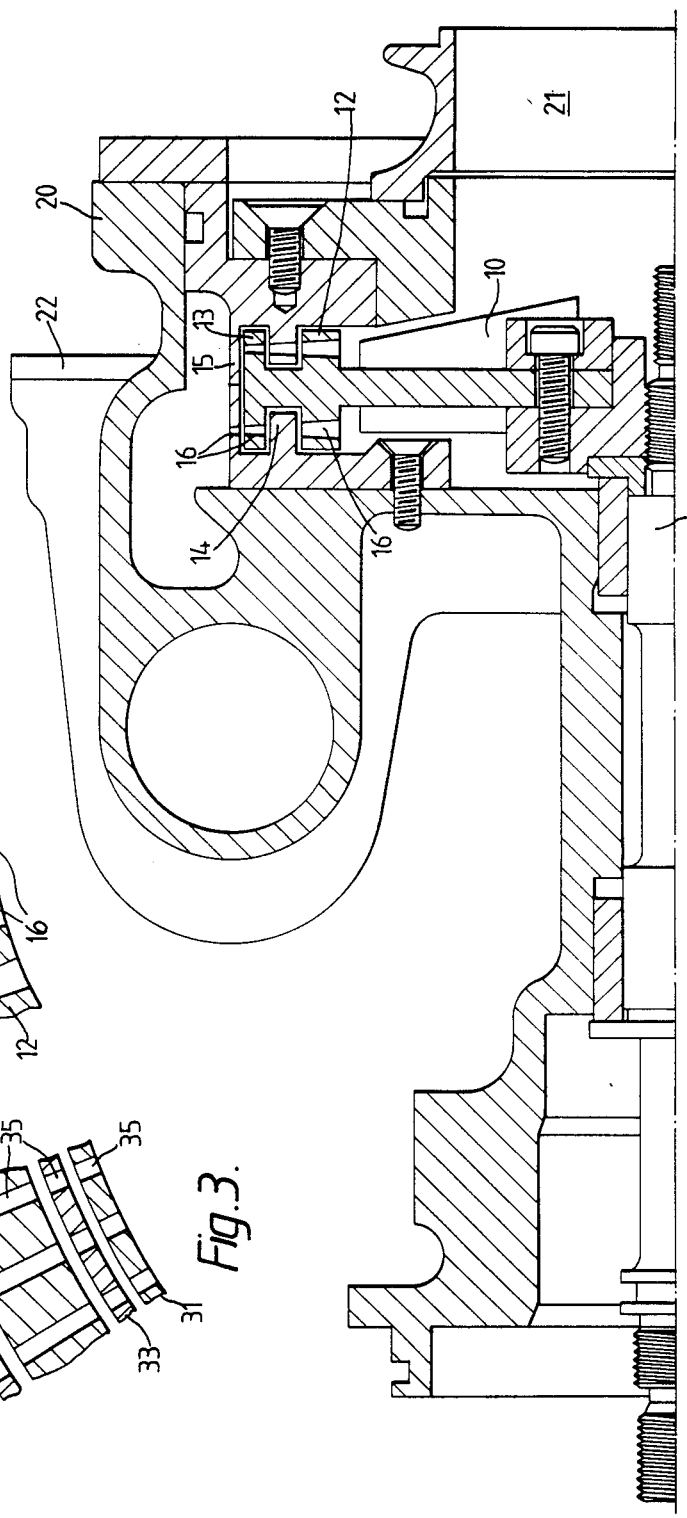

FUEL SUPPLY APPARATUS

This is a continuation-in-part application of Ser. No. 379,950, filed May 19, 1982, now abandoned.

This invention relates to methods and apparatus for supplying liquid fuel. The well known danger of a fuel fire arising in an aircraft mishap has given rise to the development of chemical anti-misting additives to the fuel which render the fuel less likely to ignite. The fuel containing the additive is placed in a fuel tank and the additive can be degraded to restore the normal qualities of the fuel during transfer to the engine. Typically the additive is a polymer which swells up rather like a sponge, physically to absorb the fuel.

The disposal of the anti-misting qualities of the additive can be effected using a degrader which subjects the fuel to a continuous shearing action. Degraders which do this are described in U.S. Pat. Nos. 4,328,926 and 4,261,175. The present invention provides an improved device and method for degrading the additive, the improvements being realized in the effectiveness of the apparatus and in minimising the apparatus bulk.

According to one aspect of the present invention a device for degrading an antimisting additive in a liquid fuel comprises a fuel pump having an impeller.

a stator degrader array comprising at least one flange surrounding said impeller.

a stator degrader array comprising at least one flange surrounding said impeller, said at least one rotary flange being interspersed with said at least one stator flange and drivably associated with said impeller, and said flanges having radial passages therethrough which have a length to passage mean diameter ratio of at least one.

The function of the passages is to subject the polymer to elongational stress, which may itself break it up, and also to facilitate a shearing action between the flanges. In the particular case where the additive has long polymeric chains, the passages perform the additional important function of aligning the chains therealong prior to shearing. The efficiency and effectiveness of this operation of the degrader is maximized when the passages are of differing length and when they taper down with increasing radius from the degrader axis. The passages may also be arranged to assist somewhat in the pumping action of the degrader. In one embodiment of the invention, the passageways are in the form of radial holes in the flanges. In an alternative embodiment of the invention, the passageways are in the form of open slots in the flanges. Preferably the passages are equispaced and differ in number as between said rotary and said stator flanges by an odd number, for example, one, to prevent the device from pulsing or operating intermittently. The expression 'passage mean diameter' refers to a diameter calculated from a mean cross sectional area, and need not imply a circular passage cross section. However, a circular cross-section is preferable. The innermost flange is preferably rotary.

According to another aspect of the present invention a method of degrading and anti-misting additive in a liquid fuel while transferring it from a fuel reservoir to a fuel burner comprises passing the fuel through a device in the form of a fuel pump having an impeller, a stator array of at least one flange surrounding the impeller and a rotary array of at least one flange surrounding the impeller, the at least one rotor flange being interspersed with the at least one stator flange and drivably associated with the impeller and the flanges having radial passages there-through which have a length to mean passage diameter ratio of at least one, whereby with the impeller and associated rotary array being rotated with respect to the stator array, fuel is pumped through the passages and the additive molecules aligned, stretched and sheared therein.

BRIEF DESCRIPTION OF THE DRAWINGS

FIG. 1 is an axial section through a degrader in accordance with the invention;

FIG. 2 illustrates the flange passage array in the degrader, and

FIG. 3 illustrates an alternative flange array.

DESCRIPTION OF THE PREFERRED EMBODIMENT

The degrader shown in FIGS. 1 and 2 comprises an impeller 10 drivably mounted on a shaft 11, a pair of rotary flanges 12, 13 surrounding the impeller 10 and mounted thereon, and a pair of stator degrader flanges 14, 15 interspersed with the rotary flanges 12, 13.

The flanges decrease in radial thickness one with respect to another, the further they are from the shaft 11, no flange thickness being an integer multiple of another. Holes 16 pass through each flange in a radial direction, the number of holes in each flange being greater by one than the next flange inside. The holes 16 all taper down with increasing distance from the shaft 11 and the smallest hole length to hole mean diameter ratio is one.

The degrader has a housing 20 with an inlet 21 and an outlet 22.

It is to be appreciated that the degrader is basically of standard fuel pump construction except for the flanges 12, 13, 14, 15.

In operation of the degrader, the fuel containing additive in polymeric chain form passes through the inlet 21, and is directed by the impeller 10 to pass through the holes 16 in the flanges to the pump outlet 22. The fuel then passes from the pump outlet 22 to an engine in known manner.

The effect of passing the fuel through the relatively long holes in the flange 12 is to align the polymer chains radially and to stretch them, thereby to encourage breaking of the chains. The relative motion of rotor and stator array causes shearing of the chains. By offsetting the holes 16 as mentioned above, the holes in the various flanges never achieve a configuration in which they are all completely blocked off by solid parts of other flanges. Thus the degrader pumps relatively efficiently from the inlet 21 to the outlet 22 while the fuel restoration is taking place, and, continuous flow is assured while throttling or pulsating fuel outflow, and consequent input energy peaks, are minimized.

Referring now to FIG. 3, there is shown an alternative arrangement of flanges, in which rotary flanges 31, 32 are interspersed with stator flanges 33, 34. The outer rotary flange 32 is significantly thicker than the others. Each flange has a series of holes 35 therein which are parallel sided and radially directed and have a length to mean hole diameter ratio greater than one.

Although the apparatus and method described in the examples above relate particularly to an aircraft context, which is certainly the one in which a fuel fire is particularly perilous and the weight saving aspects of the present invention are particularly valuable, they can, without departing at all from the present invention, be employed in other vehicles and even in static installations.

I claim:

1. A device for concurrently pumping and degrading an antimisting additive in a liquid fuel and comprising:

housing means defining an inlet, an outlet, a pumping chamber and an interior chamber establishing fluid communication between said inlet and said outlet, a fuel pump having an impeller mounted for rotational movement within said interior chamber for urging the liquid fuel to flow from said inlet to said outlet, stator degrader means including at least one stator flange surrounding said impeller, and rotary degrader means including at least one rotary flange surrounding said impeller, said at least one rotary flange being interspersed with said at least one stator flange and drivably associated with said impeller so as to rotate relative said at least one stator flange, and wherein said stator and rotary flanges together include means defining radial passages therethrough which have a length to passage mean diameter ratio of at least one so as to effectively align molecules of said antimisting additive as said fuel passes through said passages by means of said fuel pump to thereby encourage degradation of said additive molecules, said stator degrader means and said rotary degrader means together cooperating to effect shearing, and thus further degradation of said additive molecules by virtue of the relative rotational movement therebetween whereby said fuel exiting the housing through said outlet is degraded.

2. A device as claimed in claim 1 and wherein at least one of said flanges differs in radial thickness from the others.

3. A device as claimed in claim 1 and wherein said flanges have passage in the form of holes extending therethrough substantially radially of the device.

4. A device as claimed in claim 1 and wherein said flanges have passages extending therethrough, at least some of which taper down with distance outwards.

5. A device as claimed in claim 1 and wherein said at least one rotary flange has radial passages therethrough which differ in number from the passages in said at least one stator flange.

6. A device as claimed in claim 1 and wherein said at least one rotary flange has radial passages therethrough which differ in number from the passages in said at least one stator flange by one.

7. A device as claimed in claim 1 and wherein the innermost of said flanges is a rotary flange.

8. A method of degrading an anti-misting additive in a hydrocarbon fuel while transferring the fuel from a fuel reservoir to a fuel burner and comprising passing the fuel through a device in the form of a fuel pump having an impeller, a stator array of at least one flange surrounding the impeller and a rotary array of at least one flange surrounding the impeller, the at least one rotary flange being interspersed with the at least one stator flange and drivably associated with the impeller, and the flanges having radial passages therethrough which have a length to mean passage diameter ratio of at least one, whereby with the impeller and associated rotary flanges being rotated with respect to the stator flanges, fuel is pumped through the passages, the additive molecules aligned, stretched and sheared therein, and the burning quality of the fuel retarded.

* * * * *